United States Patent [19]

McCallum et al.

[11] Patent Number: 5,030,975

[45] Date of Patent: Jul. 9, 1991

[54] CHARGE TRANSFER IMAGING CARTRIDGE

[75] Inventors: Robert S. McCallum; Robert C. Kostash; Dale E. Hendrikx, all of Ontario, Canada

[73] Assignee: Delphax Systems, Mississauga, Canada

[21] Appl. No.: 403,853

[22] Filed: Sep. 5, 1989

Related U.S. Application Data

[63] Continuation of Ser. No. 180,746, Apr. 12, 1988, abandoned.

[51] Int. Cl.[5] .............................................. G01D 15/06
[52] U.S. Cl. ...................................................... 346/155
[58] Field of Search ........................... 346/76 PH, 155

[56] References Cited

U.S. PATENT DOCUMENTS 4,287,525 9/1981 Tagawa .............................. 346/155
4,348,685 9/1982 Jaouannet et al. .................. 346/155
4,607,269 8/1986 Playe ................................. 346/155
4,891,656 1/1990 Kubelik .............................. 346/155
4,951,070 8/1990 Theodoulou et al. .............. 346/155
4,958,172 9/1990 McCallum et al. ............. 346/155 X

*Primary Examiner*—George H. Miller, Jr.
*Attorney, Agent, or Firm*—Rogers & Scott

[57] ABSTRACT

A cartridge for use in charge transfer imaging comprising a flexible dielectric substrate carrying sets of driver electrodes and finger electrodes, the electrodes being separated by a dielectric layer. The respective electrodes extend in different directions to form a charge generating matrix in a first central portion generally corresponding to the extent of the dielectric layer. Each of the electrodes has individual contacts which extend to the sides of the dielectric layer. The flexible substrate is deformable from its natural planar form to a U-shape, the charge generating matrix and the dielectric layer being located on a first central portion of the substrate, and the contacts of the electrodes being located on second and third side portions of the substrate. A method of manufacturing the cartridge is also disclosed.

8 Claims, 3 Drawing Sheets

CHARGE TRANSFER IMAGING CARTRIDGE

This application is a continuation of application Ser. No. 07/180,746 filed Apr. 12, 1988 now abandoned.

BACKGROUND OF THE INVENTION

This invention relates to charge transfer imaging to create latent images on a dielectric for subsequent toning and transfer to a carrier. More particularly, the invention includes cartridges for creating the images.

The present invention is described herein with reference to an exemplary printer which utilizes a dielectric coated print drum. However, it will be clear to those skilled in the art that the present invention may also be used in combination with printers utilizing different configurations of image receiving surfaces, and indeed may be useful in machines other than printers.

There is an increasing need for peripherals which can accept a computer or word processor output and convert the output to an image on paper, commonly called a "hard copy". Typically such a peripheral is a printer which uses a charge transfer process similar to that described in U.S. Pat. Ser. Nos. 4,155,093 to Fotland and Carrish, or 4,160,257 to Carrish, which utilizes a combination of electrodes about a dielectric which can be controlled to place a charge on a drum coated for instance with aluminum oxide impregnated with a wax. In this way a latent image is built up corresponding to the image to be produced on the paper, and the latent image is then toned and transferred to the paper and fused. Should it be necessary to produce a second copy, the procedure is repeated to give as many copies as necessary. Further, it is possible to vary the image by electronic control so that parts of the image can be printed, or the complete image can be turned through 90 degrees with respect to the paper. These possible variations make such printers desirable equipment wherever hard copies of electronically generated information are required.

The print cartridge is located adjacent the print drum surface and normally extends parallel to the axis of rotation of the drum. The inner or discharge surface of the cartridge, which faces the drum surface and includes the source of the charge, must be accurately spaced from the drum such that it is close enough to produce a clear image, and yet far enough away to prevent flashover between the electrodes of the cartridge and the drum.

An example of cartridge construction is described in applicant's U.S. Pat. Ser. No. 4,679,060 and allowed U.S. patent application Ser. No. 07/014,408, both to McCallum et al. This cartridge includes a number of relatively thin planar structural layers and produces a charge transfer image by means of a charge generator in the form of a matrix of electrodes located on an inner surface of the cartridge. Outer surfaces of the cartridge facing away from the drum are provided with contacts for electrical connection of individual electrodes with corresponding spring biased contacts linked to a cartridge control board, also known as a mother board, for controlling the image generation. An exemplary configuration of printer for receiving such a cartrige is described in applicant's U.S. patent Ser. No. 4,516,847 to Maczuszenko et al. The cartridge also includes an aluminum spine which rigidifies the cartridge and extends outwardly to provide a handle to be used when the cartridge is being fitted or removed from the printer.

The cartridge is mounted in a printer on mounting blocks which are adjusted relative to rigid parts of the print structure using shims to give the desired spacing between the cartridge and the drum surface (typically 0.01 inches). Understandably, it would be difficult to adjust this spacing each time a cartridge was replaced. Accordingly, the mounting blocks are set-up during assembly of the printer and are not normally adjusted during the life of the printer, so that replacement cartridges must be accurately located on the mounting blocks. To achieve this accurate location, the lower contact surface of each cartridge must be accurately sized and is, therefore, formed of a substantial piece of high grade material, typically high grade fibre glass reinforced epoxy, which adds considerably to the cost of the cartridge. Also, particles of dust or the like may find their way between the contact surfaces of the cartridge and mounting and thus affect the spacing.

Connections between the contacts on the outer face of the cartridge and the mother board are made by spring pin contacts which extend downwardly from the mother board. These contacts are relatively expensive and the total cost of the 260 or so contacts required for a cartridge adds significantly to the total cost of the printer. Also, the spring forces exterted on the cartridge contacts by the spring contacts further complicate the accurate location of the cartridge because the accumulation of the small forces tends to push the cartridge towards the drum, and could affect the spacing between the cartridge and drum.

Other forms of cartridges are available which provide the cartridge contacts on the inner face of the cartridge and do not require such expensive spring pin contacts. However, the mother board contacts for such cartridges must be located in the restricted space between the cartridge and the drum, the space becoming more restricted as larger diameter print drums are utilized. These cartridges also suffer from the disadvantage that the spring forces from the mother board contacts tend to push the cartridge away from the drum, and again could affect the spacing between the cartridge and the drum.

These disadvantages lead to the design of a different configuration of cartridge and cartridge mounting, as described in applicant's copending U.S. Patent Application entitled Charge Transfer Imaging Cartridge Mounting and Printer. The cartridge described therein includes a rectangular cross section spine, the inner portion of the cartridge being located on an inner face of the spine and the cartridge contacts being located on side faces of the spine. The cartridge is located in a channel defined by two spaced elements, from which spring biased mother board contacts extend to bear against the cartridge contacts. As the spring forces from the mother board contacts are acting on the cartridge parallel to the inner face and the drum surface, the forces do not tend to affect the spacing between the cartridge and the drum.

It is clear that conventional methods of cartridge construction, such as that described in U.S. Pat. Ser. No. 4,679,060 and allowed U.S. Patent application Ser. No. 07/014,408, would be unsuitable to produce a cartridge having the cartridge contacts which are inclined with respect to the plane of the discharge portion, because these methods are directed towards the production of rigid planar cartridges. Similarly, manufacturing a non-planar cartridge by conventional methods would be difficult as photoetching is used to produce many of the individual components of the cartridge and it would be very difficult to use this process on anything other than planar surfaces.

SUMMARY OF THE INVENTION

It is an object of the present invention to provide a cartridge in which the electrode carrying substrate is flexible, such that the cartridge may be manufactured as a planar configuration and then formed around a rigid non-planar spine for strength and rigidity.

Accordingly, in one aspect of the present invention there is provided a cartridge for use in charge transfer imaging, comprising a flexible dielectric substrate carrying sets of driver electrodes and finger electrodes, the electrodes being separated by a dielectric layer. The electrodes extend in different directions to form a charge generating matrix in a first central portion generally corresponding to the extent of the dielectric layer. Each of the electrodes has individual contacts which extend to the sides of the dielectric layer. The flexible substrate is deformed such that it defines three mutually inclined portions, the charge generating matrix and the dielectric layer being located on a first central portion of a substrate, and the contacts of the electrodes being located on second and third side portions of the substrate. Alternatively, the electrode contacts may only extend to one side of the dielectric layer, the flexible substrate being deformed to define two mutually inclined first and second portions, the charge generating matrix and the first portion being located on the first portion of the substrate, and the electrode contacts being located on the second portion of the substrate.

This and other aspects of the present invention will now be described with reference to the accompanying drawings:

DESCRIPTION OF THE PREFERRED EMBODIMENT

Figure 1:
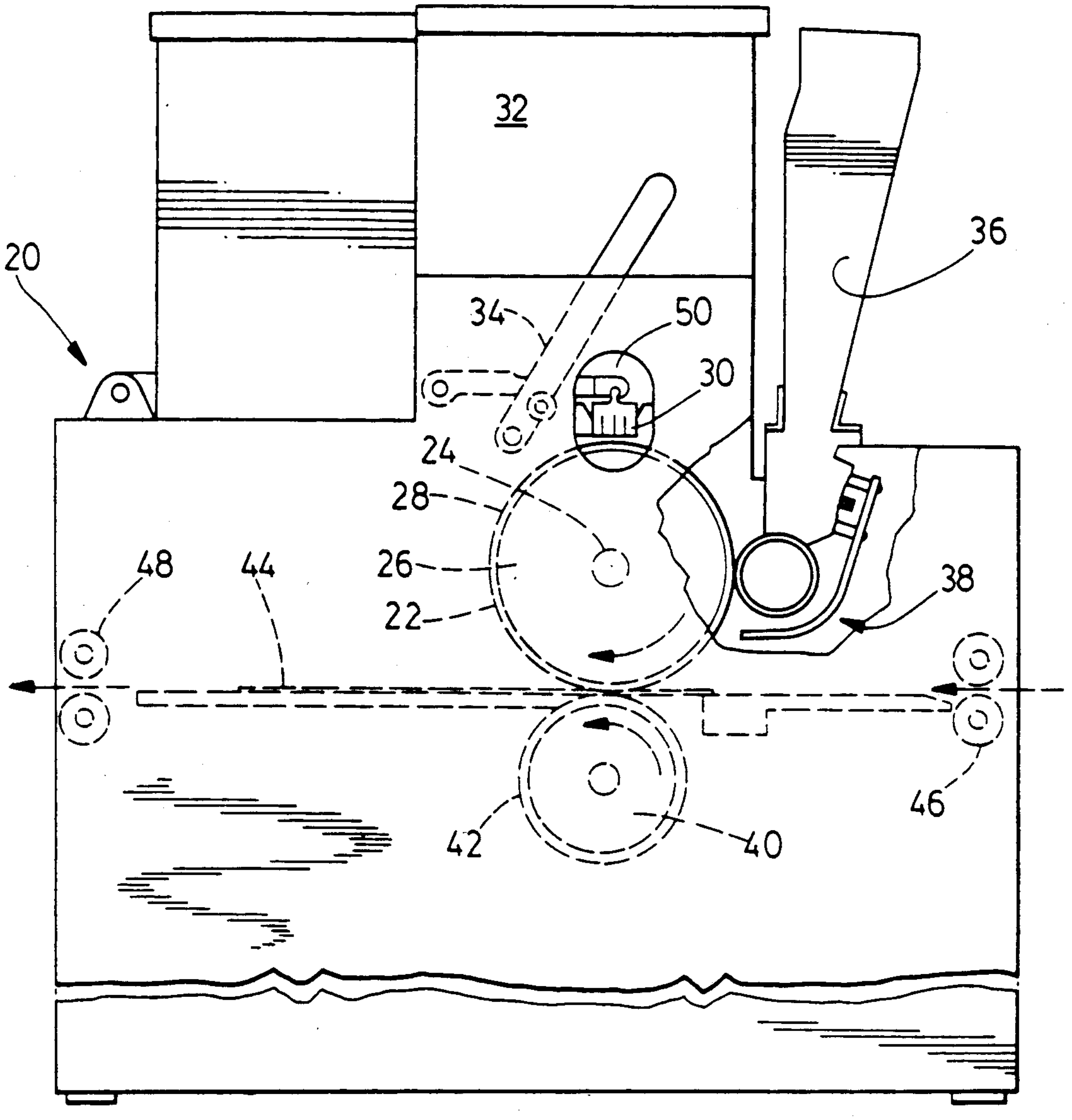
FIG. 1 is a side view of an exemplary charge transfer printer containing a cartridge according to a preferred embodiment of the present invention, the cartridge being seen in end view.

Reference is made first to FIG. 1, which is a somewhat schematic side view of an exemplary printer incorporating charge transfer imaging and including a preferred embodiment of a cartridge according to the present invention. The invention is particularly useful with this type of printer but could be used with printers of different configurations and other equipment in which charge transfer imaging is used.

A print drum 22 is mounted for rotation about an axis 24 and has an electrically conductive core 26 with a dielectric surface 28 capable of receiving an image from a charge transfer print cartridge 30 in accordance with a preferred embodiment of the present invention. The cartridge 30 is driven by an electrical control system 32 and is held in place by a cartridge mounting 34 as described in applicant's aforementioned co-pending patent application entitled Charge Transfer Imaging Print Cartridge Mounting and Printer. As the drum 22 rotates in the direction shown, a latent image is created by the cartridge 30 on the outer surface of the dielectric surface 28. This image then comes into contact with toner supplied from a hopper 36 by a feeder mechanism 38. The resulting toner image is carried by the drum 22 towards a nip formed with a pressure roller 40 having a compliant outer layer 42 positioned in a path of a receptor such as a paper sheet 44 which enters the printer between a pair of feed rollers 46. The pressure in the nip is sufficient to cause the toner to transfer onto the paper sheet and, because the axes of the drum 22 and roller 40 lie at an angle of about 45 minutes to one another, the toner will be fused to the paper as it is transferred from the drum to the paper. The paper leaves the printer between a pair of output rollers 48.

It is desirable that all operator functions and maintainance may be carried from one side of the printer, and for this purpose an access opening 50 is provided in the side of the printer to permit access to the cartridge 30 after releasing the cartridge 30 by activating the mounting 34.

Figure 2:
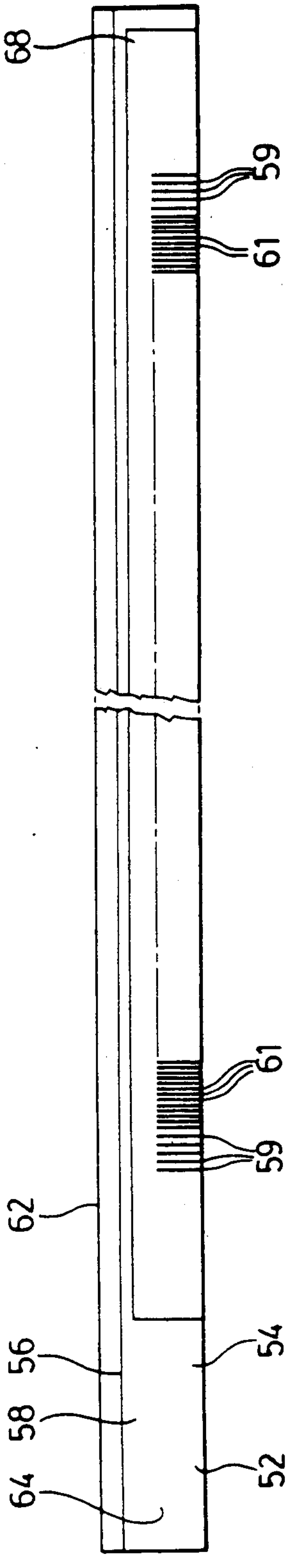
FIG. 2 is a side view of the cartridge of FIG. 1.
Figure 4:
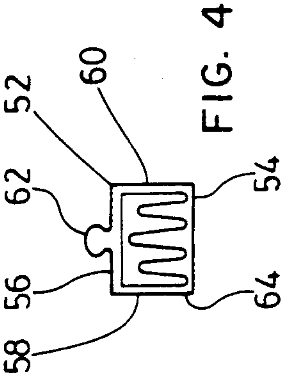
FIG. 4 is an end view of the cartridge of FIG. 2.
Figure 3:
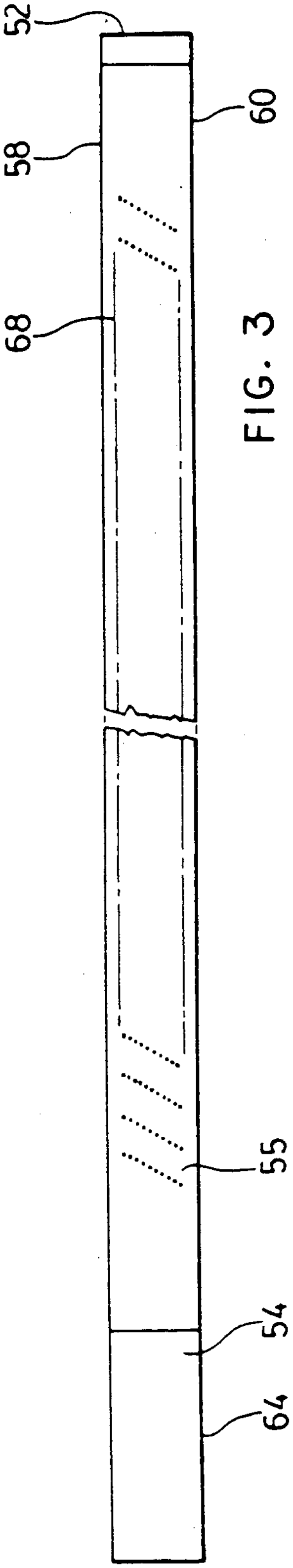
FIG. 3 is a view of the cartridge of FIG. 2 and from below.

Reference will now be made to FIGS. 2 to 4 which show various views of the cartridge 30 itself. The main structural member of the cartridge 30 is a hollow and generally rectangular elongate aluminum spine 52, having respective inner, outer and side walls 54, 56, 58, 60. The outer wall 56 is provided with a longitudinally extending locating rib 62 for engagement with the cartridge mounting 34 (FIG. 1) and one end of the spine forms a handle 64 by which the spine may be gripped to be withdrawn from the mounting 34. The interior of the spine 52 features a number of fins, one of which is designated 66, which extend outwards from the inner wall 54 parallel to the side walls 58, 60. In cartridges for use in high speed printers the fins dissipate heat from the inner wall to cooling air which is passed through the spine 52. In cartridges used in low speed printers the fins may facilitate heating of the inner wall from heating air passed through the spine or alternatively, the fins may be dispensed with a heating element located in the spine.

A flexible substrate 68 is affixed to the inner and side walls 54, 58, and 60 of the spine 52. The substrate serves as a mounting for the various components of the cartridge 30 which will be described briefly mainly with reference to FIG. 5.

Figure 5:
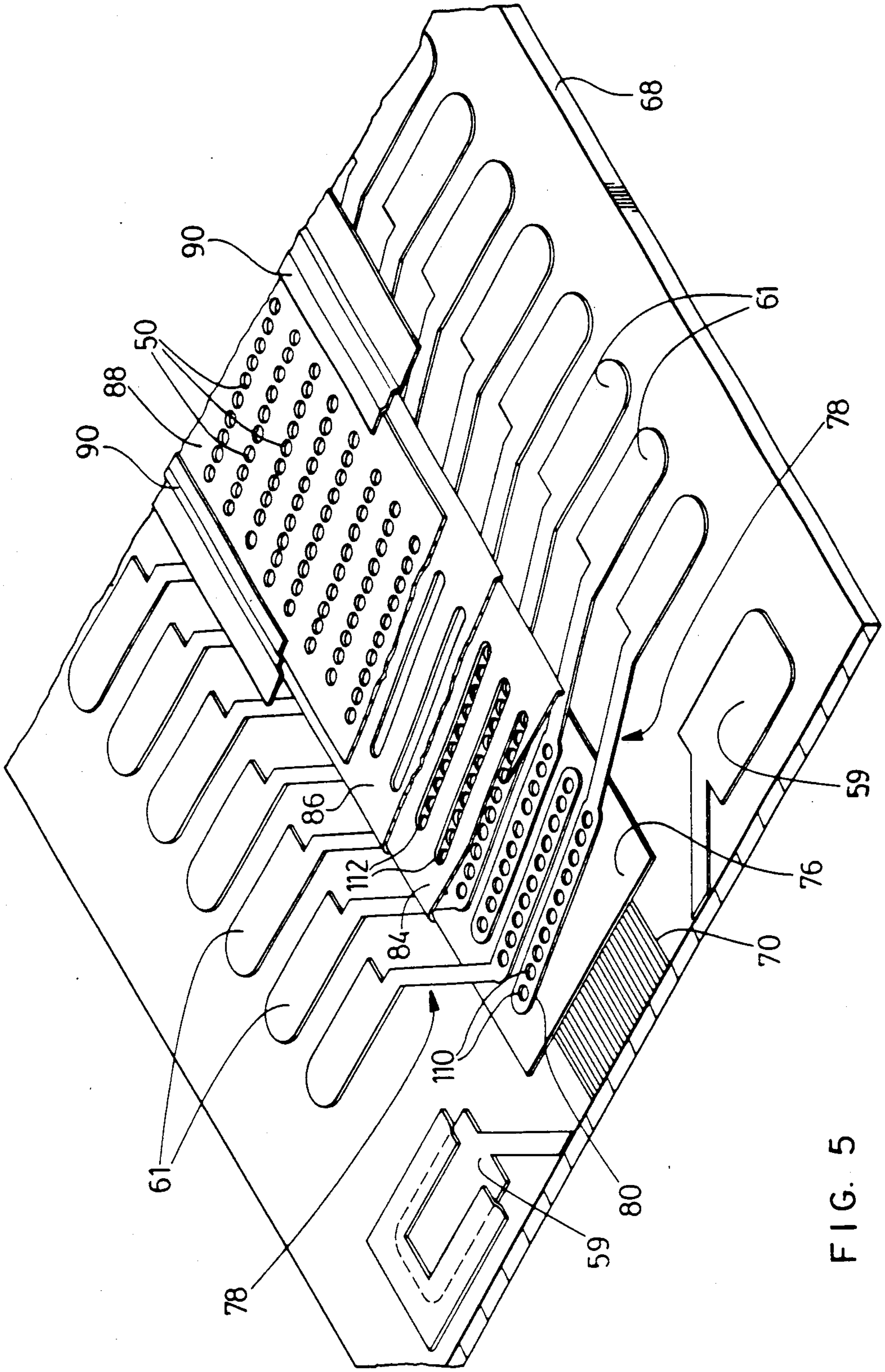
FIG. 5 is a perspective view (with layers broken away) of the cartridge of FIG. 2.

The cartridge is manufactured flat (as shown in FIG. 5) and wrapped around the spine. As a result the inner face 54 carries apertures 55 in rows and discharges take place through these apertures. Contacts to cause the discharges between electrodes, which are in alignment with the apertures, are provided on side faces 58. 60. End contacts 59 are connected to driver electrodes 70 (FIG. 5) which extend longitudinally of the spine, and contacts 61 connect to finger electrodes 78 (FIG. 5) which extend transversely over the driver electrodes as will be explained.

FIG. 5 shows a cartridge with portions broken away to show components mounted on the substrate 68 manufacture and before the substrate is flexed and affixed to the spine 52. The innermost components carried by the flexible substrate 68, are the first or driver electrodes 70. These electrodes are in fact a plurality of parallel conductors which extend longitudinally along the substrate 68, are coupled to the and individual contacts 59 extending generally transversely from one end of each of the parallel conductors 70.

A dielectric layer 76 is located over the parallel conductors 70.

Second or finger electrodes 78 are shown in FIG. 8 of form the next layer. The electrodes 78 comprise first portions 80 for, location over the dielectric layer 76, and the individual contacts 61 are arranged on alternate sides of the first portions 80 to the sides of the dielectric although cartridge designs, the contacts may all extend to one side of the dielectric layer 78.

Spacer layers 84 and 86 are located over the finger electrodes 78, and a screen electrode 88 is supported by the second or outermost spacer layer 86. The screen electrode 88 and associated spacer layers 84, 86 are optional because the driver and finger electrodes 70, 78 provide the necessary charge imaging matrix. However, print quality is considerably enhanced by use of the third screen electrode 88 which is therefore used in the preferred embodiment. An overcoat layer 90 is the final component applied to the substrate and serves to seal the screen 88 to the substrate 68.

Flexible Substrate Preparation & Driver Electrode Manufacturing

The substrate is of a flexible dielectric material such as a thin piece of glass fibre reinforced epoxy and in this example is approximately 400 mm long, 62 mm wide, and 0.1 mm thick. A suitable epoxy for use in formation of the substrate is sold under the designation FR4 by Norplex Oak of Hoosick Falls, NY and is initially provided with a copper coating of about 0.017 mm thick on both sides.

One of the copper surfaces is first prepared by cleaning with water and copper cleaner and then rinsing with water and drying in an oven. A photo resist, such as that sold under the trade mark Aquamer by Hercules, is applied to the surface and two location holes 92, 94 are punched through the various layers of photo resist, copper, and substrate. The coated substrate 68 is then located and suitable artwork (not shown) placed over the photoresist layer, the artwork also being located and being drawn against the substrate by a vacuum. After exposure, the photoresist and copper coating are etched and stripped leaving a portion of the copper coating to form the driver electrodes 70.

To provide corrosion protection for the driver electrodes 70 the exposed electrode surfaces are nickel plated. It has been found that the nickel plating is more successful if the driver electrodes 70 are electrically connected to one another during the plating operation and this may be achieved by using a first etch which leaves connections between the contacts 74. These connections are then removed by a second etch after the finger electrodes are fixed to the substrate as will be described below.

The dielectric layer 76, is applied to cover the electrodes 70. The layer 76 may be formed of any suitable dielectric material, typically mica, which is attached, after cleaning, using an ultra-violet curable epoxy. The adhesive is positioned between the mica and the conductors and then the parts are squeezed together to ensure that a uniform coating is provided and also to impregnate the adhesive between the individual driver electrodes.

Where mica is used, care should be taken not to bend or flex the portion of the substrate to which the mica is affixed as this could result in damage to the brittle mica layer.

If processing is such that it is not possible to prevent bending or flexing of the substrate, or the dimensions of dielectric required do not permit mica to be used, an alternative dielectric material should be used. Such a suitable material would be a silicone modified polymer, containing suitable wetting and flow agents, supplied in the form of a paste and is conveniently applied by screen printing, before curing with U.V. light.

The finger electrodes 78 are formed by twice etching a stainless steel foil. The first etch is carried out when the foil has been cleaned and coated on both sides with a suitable photoresist such as that sold under the Aquamer trade mark as described above. The coated foil is placed in an exposure unit between two pieces of similar artwork to form a sandwich, before being exposed from both sides. The foil is then removed from the exposure unit and etched to define the main parts of the electrodes, including holes 110 which provide edge structures to act as charge generation sites as described in U.S. Pat. No. 4,155,093.

Before locating the finger electrode foil on the substrate 68, a coating of pressure sensitive adhesive, such as that known as Densil as developed by Dennison Manufacturing which may be formed by mixing a catalyst and solvent with a resin such as that sold under the trade mark SILGRIP by G.E., is sprayed onto the substrate 68 which is then flooded with de-ionized water. The cleaned foil is placed on the substrate and moved from side to side to wet the adhesive. The foil floats in the water to allow location of the foil relative to the parallel driver electrodes 70, this locating operation being carried out beneath a microscope. When the foil is correctly aligned, one corner of the foil is pressed into contact with the dielectric layer 76. The substrate 68 is then placed on a dry surface and water absorbent wipes are pressed on the foil to absorb the de-ionized water so that the foil is brought into contact with the dielectric layer 76 and the substrate 68. The assembly is then dried before being rolled together to ensure proper adhesion of the foil to the substrate.

the resulting sub-assembly is then subject to the secondary lamination, imaging, and etching, to separate adjacent fingers. The etching and is only carried out at this stage as the separation of the fingers at an earlier stage would have weakened the foil and made it more difficult to handle. Also noticeable that the artwork 104 includes apertures 112, 113 for receiving alignment pins and from FIG. 5 it will be noted that the driver and finger electrodes extend to a similar width on the substrate.

The next stage of the process is the application of first and second spacer layers 84, 86 which are formed by separately laminating the substrate 68 with a dry film solder mask, such as that sold under the trade mark VACREL by DuPont. The respective solder masks are independantly covered with appropriate artwork and exposed.

After the substrate 68 has been laminated with the two exposed layers, which have a combined thickness of approximately 0.006 inches, the solder mask is developed to remove the unexposed solder mask and rinsed and dried. The spacer layer 84 comprises a central portion 114 to cover the first portions 80 of the finger electrodes 78. This portion is provided with a plurality of parallel slots 112 corresponding to the rows of apertures 110 formed, in the first portions 80 of the finger electrodes 78. End portions are provided to occupy the spaces between the contacts 59 of the driver electrodes.

The second spacer layer 86, is shaped to cover only the central portion of the first spacer layer 84 and has aligned slots 114.

The screen electrode 88, is formed by laminating, exposing and etching a cleaned stainless steel foil to produce an etched foil. The screen 88 is formed with a the aforementioned apertures 55, arranged in parallel lines corresponding to the respective apertures and slots of the finger electrodes and spacer layers.

To assemble the substrate 68 and screen 88, the substrate is placed on a smooth work surface and a bead of pressure sensitive adhesive, such as Densil, applied to each end of the substrate. The screen 88 is then positioned on the substrate and located accurately by use of a microscope. When the screen has been correctly located it is pushed down to spread the adhesive to form a larger adhesion area.

The edges of the screen 88 are sealed to the substrate by means of the solder mask overcoat layer 90 is formed by locating a screen mask of 4 mm thick stainless steel on the screen 88 over the screen apertures and then laminating the substrate with solder mask. Appropriate artwork is placed over the solder mask, and the screen 88 and screen mask, buried within the solder mask, are exposed. The coversheet is then removed, the solder mask developed, and the screen mask removed to leave an overcoat layer 90 which acts to seal down the edges of the screen 88.

The substrate assembly is now ready for application to the spine 52 (FIG. 3) and a layer of double sided adhesive tape is applied to the outer face of the substrate. The portion of the substrate carrying the parallel conductors 72 and the first portions 80 of the finger electrodes is then affixed to the inner wall 54 of the spine 52, alignment pins being used to ensure the accurate location of the substrate on the spine. The substrate 68 is then bent along two imaginary longitudinal lines 150, 152 (FIG. 5) which separate the parallel conductors 70 from the driver electrode contacts 74 and the first portions 80 from the finger electrode contacts 82 to form three mutually inclined portions. The contact carrying side portions of the substrate are secured to the side walls 58, 60 of the spine 52. Thus, the charge generating portion of the cartridge is located on the inner wall 54 and the contacts extend across the side walls 58, 60, orthogonally inclined to the inner wall 54.

As solder mask becomes brittle on curing, the various solder mask layers cured at this point by exposing the overcoated substrate under a U.V. light capable of delivering 3 to 5 Joules/cm. Where VACREL solder mask is used, complete cure changes the solder mask colour from dark green to light green in areas where multiple layers are present, and to almost yellow where only a single layer of solder mask is present.

The now complete cartridge 30 may be placed in a printer as described above, and the electrodes 70, 78 selectively energized to create a pattern of charges at the apertures 110 in the finger electrodes 78 which are directed through the screen apertures 55 onto the print drum to form an charged image thereon.

Thus, the present invention provides a cartridge in which the cartridge contacts are inclined relative to the discharge portion of the cartridge. As described above, this allows contacts to be made to the cartridge control system through contacts which are not aligned to act in the same direction as the accurately sized gap between the cartridge and the print drum.

It will be obvious to those skilled in the art that the particular configuration of print cartrige, and the processes and materials described above, are exemplary of a particular form of print cartridge and its manufacture and that other known processes may be utilized to manufacture different cartridges to benefit from the present invention. For example, the substrate need not necessarily be fixed to a rectangular cross-section spine, and may be fixed, with equal effect, to a spine having a triangular cross-section. Also, where electrode contacts extend from only one side of a cartridge, an L-shaped spine may be used to support the substrate.

We claim:

1. A print cartridge for use in charge transfer imaging, comprising:

a rigid tubular spine extending longitudinally and defining first and second side faces and a third face extending between the side faces;

a flexible substrate having first and second portions, the first portion being on said third face and the second portion being on said first face, the first portion including a dielectric layer, first electrodes extending in a first direction on said dielectric layer, and second electrodes extending in a second direction separated from the first electrodes by said dielectric layer, the second direction being longitudinal with reference to the spine and the second electrodes defining edge structures; and individual exposed surface contacts connected to the electrodes and positioned on said second portion of the substrate separated from the first portion by an imaginary straight line, the substrate being deformed along said line whereby connection to the print cartridge is made at the individual contacts.

2. A print cartridge as claimed in claim 1 in which the first electrodes comprise parallel conductors extending in said first direction and in which the individual contacts for the first electrodes extend generally transversely from an end of each of the conductors; and the cartridge further comprising a third portion separated from the first portion by a further imaginary straight line, the imaginary straight lines being parallel and to either side of the first portion generally in parallel with the the first electrodes, and in which some of said individual contacts are positioned on the third portion.

3. A cartridge as claimed in claim 2, and further comprising:

a dielectric spacer layer covering the first portions of the second electrodes; and a screen electrode over the dielectric spacer layer, the screen defining rows of discrete openings corresponding to the edge structures of the first electrodes.

4. A cartridge as claimed in claim 3, in which a further spacer layer seals the screen electrode onto the substrate.

5. A cartridge as claimed in claim 2, in which the ends of the contacts of the first and second electrodes are sealed to the substrate by a layer of material.

6. A cartridge as claimed in claim 2, and further comprising:

a stiff spine attached to the substrate to rigidify the cartridge, three faces of the spine corresponding to the shape of the deformed substrate.

7. A cartridge as claimed in claim 2, in which each of the second electrodes comprises:

a first central portion defining a row of apertures straddling the parallel conductors of the first electrodes and defining said edge structures.

8. In a cartridge for use in charge transfer imaging having a dielectric substrate fixed to a spine, first electrodes printed on the substrate and having parallel conductors extending generally longitudinally and individual contacts extending generally transversely from ends of the conductors, a dielectric layer covering at least the parallel conductors so that the conductors are at a first side of the layer, and second electrodes at the opposite side of the dielectric layer defining edge structures straddling the parallel conductors of the first electrodes and having individual contacts to the side of the parallel conductors, the improvement in which:

the substrate is deformed along two generally parallel imaginary longitudinal lines to form three mutually inclined portions corresponding to a cross section of a portion of the spine;

the parallel conductors of the first electrodes, the dielectric layer, and the first portion of the second electrodes straddling the first electrodes are located on a first central portion of the substrate; and the contacts of the first and second electrodes are located on second and third side portions of the substrate.

* * * * *